Jan. 16, 1962 J. W. MEERMANS 3,017,230
LUBRICATION SYSTEM
Filed Aug. 22, 1957

JOHN W. MEERMANS,
INVENTOR.

BY *Theodore E. Bieber*

Attorney.

United States Patent Office 3,017,230
Patented Jan. 16, 1962

3,017,230
LUBRICATION SYSTEM
John W. Meermans, North Hollywood, Calif., assignor to The Garrett Corporation, Los Angeles, Calif., a corporation of California
Filed Aug. 22, 1957, Ser. No. 679,728
22 Claims. (Cl. 308—187)

This invention pertains to lubrication systems and, more particularly, to lubrication systems for high speed rotating machinery.

In many high speed machinery applications, for example in turbine driven fluid circulating units used in the air conditioning systems of aircraft and other vehicles, the rotating parts turn at speeds of 50,000 to 100,000 r.p.m. or more. In prior machinery of this type, it has been customary to use wool wicking or other fibrous felted or woven wick materials to conduct the lubricant from the lubricant reservoir or sump to the bearings. While such wicking is adequate for some systems, it has several disadvantages. For example, the use of such wicking precludes the operation of the turbine at high temperatures at which the wicking will char or tend to burn or be otherwise adversely affected. Also, due to the small quantity of lubricant usually supplied to the bearings by wicking, dirt tends to accumulate in the bearings and is not flushed from them. These and other problems have been aggravated in recent applications by the requirements for turbine units to run at increasingly higher temperatures and speeds.

This invention would solve the above problems by providing a lubrication system incorporating a hollow, capillary, filter-like pickup element for the lubricant together with pump means to transfer the lubricant from the pickup element to the bearings. The pickup element may be mounted in the machinery within, extending into, or connected to, the lubricant reservoir or sump. While a pickup element formed of sintered metal is preferred, other suitable porous materials which have good capillary action may also be used. The pump means, preferably a jet pump operated by a gaseous fluid, is used to extract lubricant from the pickup element and pump it to suitable nozzle means disposed to direct the lubricant and fluid mixture onto the bearings. In most aircraft applications the air which drives the turbine unit may be used to operate the jet pump and this air will atomize the lubricant and assist in cooling the bearings.

The lubrication system disclosed herein has several useful and important advantages. For example, the system is not sensitive to temperature changes. It therefore has a high oil delivery rate either at very high temperatures at which wicking will char or at very low temperatures at which wicking cannot perform its function because of thickening of the lubricant. The capillary lubricant pickup element and pump means disclosed herein, for example, have been successfully operated when the temperature of the lubricant was as low as —45° F. and as high as 330° F.

It is to be noted that the lubricating system according to the invention has no parts contacting the shaft of the turbine. It, therefore, is unaffected by the rotation of the shaft.

Furthermore, the hollow, capillary pickup element will filter out foreign particles from the lubricant, and will also remove water which may be present in the lubricant. In addition, due to the great capillarity of the pickup element, it will supply lubricant to the pump means regardless of the attitude in which the machinery may be positioned, providing some portion of the pickup element touches the lubricant.

Accordingly, the principal object of this invention is to provide a novel lubrication system for high speed machinery, incorporating a positive means for transferring lubricant from the lubricant reservoir or sump to the bearings, regardless of the attitude of the machinery.

Another object of this invention is to provide a high speed, fluid driven unit with a unique lubrication system incorporating a porous lubricant pickup element and positive means for transferring lubricant from the pickup element to the bearings.

Another object of this invention is to provide, in a fluid driven turbine, a lubrication system having a filter-like capillary lubricant pickup element about the inner periphery of a lubricant reservoir and having means operated by the turbine motor fluid for transferring lubricant from the pickup element to the bearings.

Still another object of this invention is to provide a pneumatically driven turbine with a novel lubrication system utilizing a hollow, annular, sintered metal filter-like lubricant pickup element and a pneumatically operated jet pump for transferring lubricant from the pickup element to the bearings.

A still further object of this invention is to provide a novel bearing lubricating system capable of operating under extremes of temperature and at any attitude.

These and other objects and advantages of this invention will be more apparent to those skilled in the art from the following detailed description of a preferred embodiment when taken in conjunction with the accompanying drawing, in which.

Figure 1:
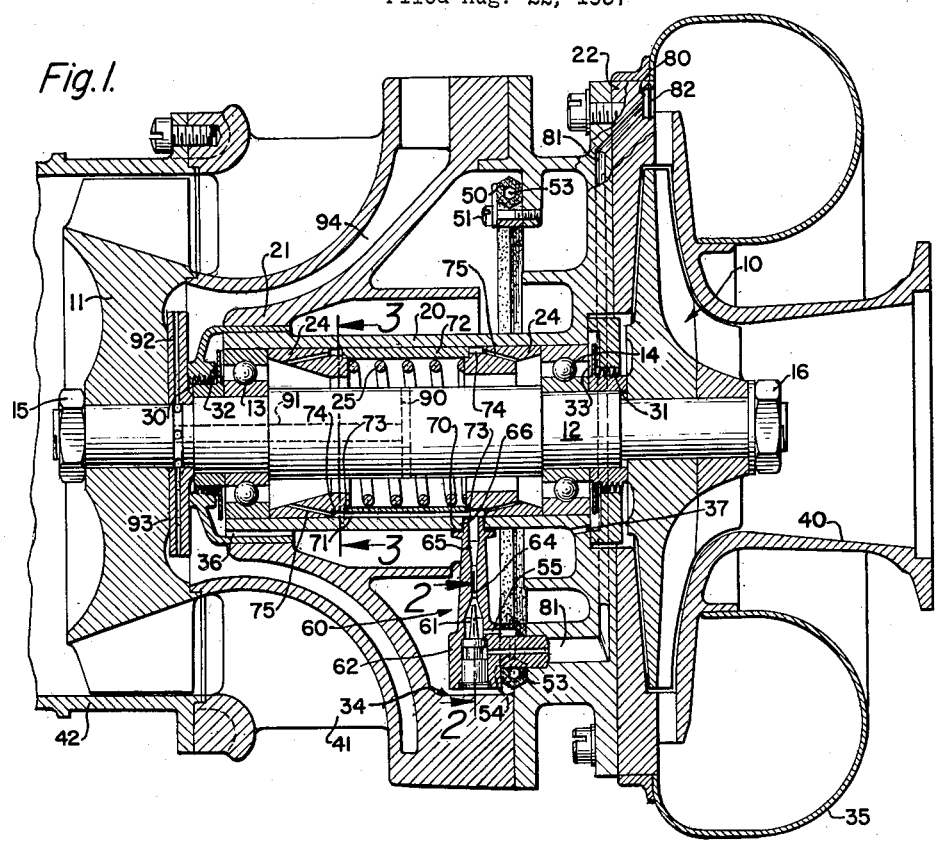
FIG. 1 is a cross-section of a turbine driven circulating unit incorporating this invention.

Referring to FIG. 1, there is shown a fluid driven turbine circulating unit having a turbine wheel 10 mounted on one end of a shaft 12 and a circulating fan 11 mounted on the other end of the shaft. The turbine wheel 10 and the fan 11 are secured to the ends of the shaft 12 by any desired means, such as nuts 15 and 16. In addition to securing the turbine wheel and the fan to the shaft 12, the nuts also lock the inner races of the ball bearings 13 and 14 against outwardly projecting shoulders formed on the shaft. The outer races of the bearings 13 and 14 are mounted in a tubular bearing carrier 20 whose left-hand end is supported by the left section 21 of the housing. The right-hand end of the bearing carrier is fastened to the right section 22 of the housing by means of a plurality of cap screws which pass through openings in a flange formed on the bearing carrier and thread into the section 22. The bearing carrier is also secured to the left section 21 of the housing by any desired means, not shown. The outer races of the bearings are spaced by means of two ring-shaped spacing members 24 adjacent each bearing and a center spacing member 72. A compression spring 25 which reacts at each end against the ring-shaped spacing members 24 is provided for applying an axial load on the bearings. The fan 11 is isolated from the bearings by means of a labyrinth seal 30. Projecting radially outwardly from one end of the rotating portion of the labyrinth seal 30 is a slinger 32 which is provided for returning lubricant from the bearing 13 through passageway 36, to an annular lubricant reservoir or sump 34 formed in the housing and surrounding the rotating assembly. A similar labyrinth seal 31, slinger 33 and passageway 37 are provided at the other end of the shaft for isolating the turbine wheel 10 from the bearings. The turbine wheel 10 is provided with an inlet scroll 35 which is secured to the section 22 of the housing by any desired means (not shown). The turbine wheel is also provided with a tubular outlet 40 which is formed on the end section of the turbine unit. The fan unit is provided with an annular inlet 41 formed in the left section 21 of the housing and a tubular discharge duct 42 which surrounds the outer periphery of the fan.

The lubrication system of the above unit consists of a hollow, capillary, filter-like lubricant pickup element 50 which is mounted in the housing so as to surround the outer surface of the bearing carrier 20, about the inner periphery of the reservoir 34. The pickup element is secured to a flange on the bearing carrier 20 by means of cap screws 51 threaded into the flanges. The lubricant pickup element may be formed of any suitable porous material, such as sintered bronze, having adequate capillarity.

The filter-like lubricant pickup element 50 may also be made of other porous materials which have good capillary characteristics, such as felt or other organic or inorganic materials, the selection of the material being dependent upon the temperature range and other factors to be encountered. Of course, if the material used is not self-supporting, it will be necessary to provide the required support or stiffening by other means, as for example, by a coil spring on the inside of the pickup element. The pickup element, due to its capillary action, will supply lubricant to the pump described below regardless of the attitude of the turbine unit, providing some portion of the pickup element is in contact with the lubricant contained in the reservoir 34. Under some conditions, this capillary action may be sufficient to completely fill the pickup element with liquid lubricant, depending on the size of the pickup element and the pump suction. The lubricant contained in the reservoir 34 may be either free liquid or lubricant-saturated packing. The use of lubricant-saturated packing allows more lubricant to be stored in the unit than is possible with a free liquid system, since the liquid level should be maintained below the outer surface of the bearing carrier 20 when free liquid is used.

Figure 2:
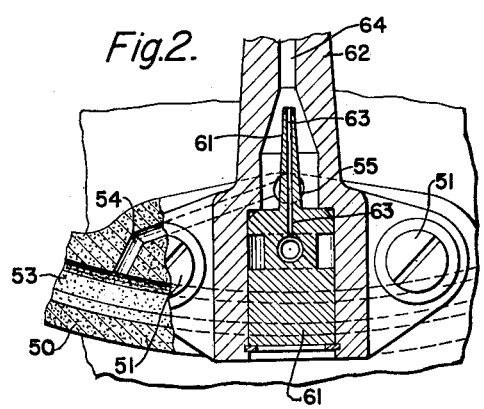
FIG. 2 is a section along line 2—2 of FIG. 1 showing the mounting of the lubricant pickup element and the jet pump used for transferring oil from the pickup element to the bearings.

The interior 53 of the hollow lubricant pickup element is connected to the suction inlet of the jet pump 60 by means of a passageway 54 formed in the pickup element which, in turn, connects with a horizontal passageway 55 formed in the body 62 of the jet pump (as seen in FIG. 2). The jet pump 60 is shown in the form of an air driven pump of the ejector type, provided with an inlet nozzle 61 which has a central passageway 63 formed therein. The inlet nozzle 61 is secured to a central opening formed in the bottom of the jet pump body 62 by any desired means, such as, threads or the like (not shown). The central passageway 63 in the inlet nozzle is aligned axially with the axis of a throat portion 64 of the jet pump. The throat portion 64 of the jet pump connects with the discharge passageway 65 formed in the upper part of the jet pump body. The upper end of the jet pump body is secured in an opening 66 formed in the side wall of the bearing carrier 20 by any desired means such as threads or the like. A suitable gasket 70 is placed between the end of the jet pump and the outer surface of the bearing carrier to insure a fluid-tight connection between the two.

The opening 66 in the bearing carrier connects with a longitudinal passageway 71 formed in the outer surface of the center spacer 72. The opposite ends of the center spacer 72 project into annular recesses 73 formed in the adjacent ends of the ring-shaped spacing members 24. This overlapping between the ends of the center spacer and the ring-shaped spacing members is provided to prevent leakage of the lubricant and air mixture between the ends of the spacing members in case the spring 25 moves the spacing members 24 a slight amount.

Figure 3:
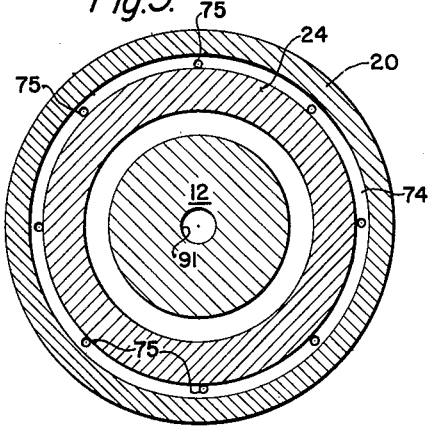
FIG. 3 is a section taken along line 3—3 of FIG. 1 showing the annular row of nozzles used for directing in the oil and air mixture against the bearings.

The longitudinal passageway 71 in the center spacer 72 connects with an annular passageway 74 formed in the adjacent end of each of the spacing members 24 as seen in FIG. 3. The annular passageway 74 connects with a plurality of circumferentially spaced passageways or nozzles 75 which are formed in each of the spacing members 24. The nozzles 75 are directed radially inwardly in the spacing members 24 so that they can direct the lubricant and air mixture against the bearings 13 and 14.

The inlet of the jet pump 60 is connected to an inlet opening 80 formed in the section 22 of the housing by means of a passageway 81 formed in the bearing carrier 20 and the section 22. The inlet 80 should be provided with a filter element 82 to remove foreign matter from the fluid bled from the turbine unit for operating a jet pump. The inlet opening 80 should be located above the normal lubricant level in the sump 34 to prevent the lubricant from draining into the turbine unit when the unit is shut down.

The interior of the bearing carrier 20 between the labyrinth seals 30 and 31 is vented to the atmosphere by means of a radial passageway 90, a longitudinal passageway 91 formed in the shaft 12, and a radial passageway 92 formed in the spacer 93. Sufficient centrifugal head will be created in the radial passageway 90 to separate the lubricant from the air while still permitting the difference in the radial length of the two radial passageways 90 and 92 to vent the bearing carrier. The atmosphere vented through the passageway 92 will flow out through a passageway 94 formed in the left section 21 of the housing to the atmosphere surrounding the unit.

When the circulating unit described above is operated by admitting compressed air to the inlet scroll 35 of the turbine, compressed air will be supplied through the opening 80 and passageway 81 to the jet pump 60. When the compressed air flows through the nozzle 61 of the jet pump, it will create a low pressure in the passageways 54 and 55 which, in turn, will draw lubricant from the interior 53 of the lubricant pickup element 50. Due to the capillary rise of lubricant through and up the porous walls of the lubricant pickup element, the walls of the element will remain wet with lubricant. This lubricant, in turn, is removed by the induced air flow through the walls of the element and is carried as an air-lubricant mist through the passages 54 and 55 to the jet pump 60. The compressed air flowing from the end of the inlet nozzle 61 of the jet pump issues as a high velocity jet which moves the air-lubricant mist surrounding it into the portion 64 of the jet pump where the air-lubricant mist mixes with the compressed air and the lubricant is atomized to a fine mist. This lubricant and air mixture will then flow out the discharge 65 of the jet pump and into the longitudinal passageway 71. Upon flowing into the longitudinal passageway 71, the lubricant and air mixture will divide and substantially half will flow toward each bearing. The portion of the lubricant and air mixture flowing in each direction will be conducted to the plurality of nozzles 75 by means of the annular passageway 74 formed in each of the spacers 24. The nozzles 75, in turn, will direct the lubricant and air mixture against the bearings 13 and 14.

From the above description of a preferred embodiment of this invention, together with its operation, it can easily be seen that this invention provides a unique lubricating system for a high speed, turbine driven circulating unit which utilizes the same medium used for operating the turbine to operate the lubricating system. Since the turbine unit described above operates on compressed air, it is possible to discharge the compressed air and lubricant mixture directly onto the bearings, which in turn provides a means for both lubricating the bearings and cooling them. The pickup element 50 not only removes the foreign material and water from the lubricant, but also, due to its great capillary action, provides a means for transferring lubricant from the lubricant reservoir to the suction inlet of the jet pump 60, regardless of the attitude of the turbine, providing some portion of the pickup element touches the lubricant in the reservoir.

While but one preferred embodiment of this invention has been described in detail, many modifications and changes will occur to those skilled in the art within the broad spirit and scope of the invention.

I claim:

1. A bearing lubrication system comprising: a shaft rotatably supported by at least one bearing; a casing means for supporting said bearing; a lubricant reservoir formed in said casing; an annular hollow lubricant pickup element mounted in said reservoir and surrounding said shaft; a jet type pump, the suction of said pump being connected to the interior of said pickup element and the discharge of said pump being connected to distributing means having an end terminating adjacent said bearing.

2. A bearing lubrication system for a rotating shaft comprising: a casing; bearing means mounted in said casing for rotatably supporting said shaft; means forming a lubricant reservoir in said casing; a continuous closed hollow lubricant pickup element mounted in said reservoir; a jet type pump mounted in said casing, the suction of said pump being connected to the interior of said pickup element and the discharge of said pump being connected to a passageway, said passageway terminating in at least one open end adjacent said bearing means.

3. A gaseous fluid operated turbine comprising: a turbine wheel mounted on a shaft; bearing means for rotatably supporting said shaft; a casing for supporting said bearing means; an inlet and outlet formed in said casing for said turbine wheel; a lubricant reservoir formed in said casing; a continuous hollow lubricant pickup element mounted in said casing, at least a portion of said pickup element contacting the lubricant contained in said reservoir; a jet type pump disposed in said casing with the suction of said pump connected to the interior of said pickup element and the discharge of said pump being connected to a passageway, said passageway terminating in an open end adjacent said bearing means; inlet means for connecting a source of pressurized fluid to said jet pump and conduit means for connecting said inlet means to said inlet of said turbine wheel.

4. A pneumatic turbine comprising: a turbine wheel mounted on a shaft; bearing means mounted in a casing for rotatably supporting said shaft; an inlet and outlet formed in said casing for said turbine wheel; a lubricant reservoir formed in said casing; a continuous hollow lubricant pickup element mounted in said casing, at least a portion of said pickup element contacting the lubricant contained in said reservoir; a pneumatically operated jet pump disposed in said casing with the suction of said pump connected to the interior of said pickup element and the discharge of said pump being connected to a passageway, said passageway terminating in an open end adjacent said bearing means; inlet means for connecting a source of pressurized air to said jet pump; and conduit means for connecting the inlet of said turbine to said inlet means.

5. A pneumatic turbine comprising: a turbine wheel mounted on a shaft; bearing means mounted in a casing for rotatably supporting said shaft; an inlet and outlet formed in said casing for said turbine wheel; an oil reservoir formed in said casing; a continuous hollow lubricant pickup element mounted in said casing, said pickup element surrounding said shaft, at least a portion of said pickup element contacting the lubricant contained in said reservoir; a pneumatically operated jet pump disposed in said casing with the suction of said pump connected to the interior of said pickup element and the discharge of said pump being connected to a passageway; said passageway being connected to nozzle means disposed in said casing to direct the discharge of said pump against said bearing means; inlet means for connecting a source of pressurized air to said jet pump; and conduit means for connecting said inlet to the inlet of said turbine.

6. A turbine comprising: a casing; a turbine wheel mounted on a shaft in said casing; bearing means for rotatably supporting said shaft; inlet and outlet means formed in said casing for establishing a flow path through said turbine wheel; a lubricant supply means; a hollow lubricant pickup element having a porous wall formed of material having good capillarity, said wall having a portion disposed in contact with the lubricant in said supply means; and pump means connected with the interior of said lubricant pickup element for inducing a flow of air through the wall of said pickup element and for transferring the lubricant and air mixture from said pickup element to said bearing means.

7. A pneumatic turbine comprising: a turbine wheel mounted on a shaft; bearing means mounted in a casing for rotatably supporting said shaft; inlet and outlet means formed in said casing for establishing a flow path through said turbine wheel; a lubricant reservoir formed in said casing; an annular hollow lubricant pickup element mounted in said casing and surrounding said shaft, at least a portion of said pickup element contacting the lubricant contained in said reservoir; pneumatically operated pump means for transferring lubricant from said pickup element to said bearing means; the discharge of said pump, including the pneumatic fluid used in operating said pump, being directed by nozzle means against said bearing means; and passage means for connecting said pump to the inlet means of said turbine.

8. A pneumatic turbine comprising: a turbine wheel mounted on a shaft; bearing means mounted in a casing for rotatably supporting said shaft; inlet and outlet means formed in said casing for establishing a flow path through said turbine wheel; a lubricant reservoir formed in said casing; an annular hollow lubricant pickup element mounted in said casing and surrounding said shaft, at least a portion of said pickup element contacting the lubricant contained in said reservoir; pneumatically operated pump means for transferring lubricant from said pickup element to said bearing means; the discharge of said pump being connected to distribution means including a plurality of circumferentially spaced nozzles, surrounding said shaft and disposed to direct said discharge against said bearing means; and passage means for connecting said pump to the inlet means of said turbine.

9. A bearing lubrication system comprising: a shaft; bearing means mounted in a casing for supporting said shaft; lubricant supply means disposed in said casing; a lubricant pickup element formed of a porous material having good capillary action disposed in said casing with at least a portion of said pickup element contacting the lubricant contained in said supply means; a chamber formed in said pickup element; and means connected to the chamber in said pickup element for removing lubricant that permeates into said chamber and discharging it adjacent said bearing means.

10. A bearing lubrication system comprising: a shaft; bearing means mounted in a casing for supporting said shaft; lubricant supply means disposed in said casing; a closed hollow lubricant pickup element disposed in said casing with at least a portion of said pickup element contacting the lubricant contained in said supply means, said pickup element being formed of a sintered material; and means for removing lubricant from the interior of said pickup element and discharging it adjacent said bearing means.

11. A bearing lubrication system comprising: a shaft; bearing means mounted in a tubular bearing carrier; shaft seals adjacent opposite ends of said bearing carrier; a casing for supporting said bearing carrier; a lubricant supply means disposed in said casing; a lubricant pickup element having a porous wall formed of material having good capillarity disposed in said casing with at least a portion of said wall contacting the lubricant contained in said supply means; a chamber formed in the interior of said pickup element; pump means connected with the interior of said lubricant pickup element for inducing a flow of air through the wall of said pickup element and for removing the lubricant and air mixture from the chamber in interior of said pickup element and discharging it adjacent said bearing means; and means for venting the interior of said bearing carrier to the atmosphere surrounding said casing.

12. A bearing lubrication system comprising: a shaft; bearing means mounted in a tubular bearing carrier; means adjacent each end of said bearing carrier for preventing the loss of lubricant from the interior thereof; a casing for supporting said bearing carrier; a lubricant supply means disposed in said casing; a lubricant pickup element having a porous wall formed of material having good capillarity disposed in said casing with at least a portion of said wall contacting the lubricant contained in said supply means; a chamber formed in the interior of said pickup element; pump means connected with the interior of said lubricant pickup element for inducing a flow of air through the wall of said pickup element and for removing the lubricant and air mixture from the chamber in said pickup element and discharging it adjacent said bearing means; and means for venting the interior of said bearing carrier to the atmosphere surrounding said casing.

13. A pneumatic turbine comprising: a turbine wheel mounted on a shaft; bearing means for rotatably supporting said shaft, said bearing means being mounted in a tubular bearing carrier; seal means adjacent opposite ends of said bearing carrier; casing means for said turbine, said casing means having an inlet and outlet, said bearing carrier being supported by said casing means; a lubricant supply means disposed in said casing; a closed hollow lubricant pickup element disposed in said casing with at least a portion of said pickup element contacting the lubricant contained in said supply means; pneumatically operated pump means for removing lubricant from the interior of said pickup element, the discharge of said pump means including the pneumatic fluid used for operating said pump being discharged adjacent said bearing means; passageway means for connecting said pump to the inlet of said turbine; and means for separating the lubricant from the atmosphere in said bearing carrier, venting the atmosphere to the atmosphere surrounding said turbine and returning the lubricant to said supply means.

14. A system for supplying a stream of a gaseous dispersion of a liquid, comprising: means forming a reservoir for a supply of liquid; a liquid pickup element including a porous wall formed of material having good capillarity to said liquid, said wall having at least a portion in contact with the liquid in said reservoir so that the liquid rises in said wall by capillary action; a chamber formed in said pickup element; and means for inducing a flow of gaseous fluid through the wetted wall into the chamber in said pickup element and for discharging the gas-liquid mixture which has passed into the chamber in said pickup element.

15. A system for supplying a stream of a gaseous dispersion of a liquid, comprising: means forming a reservoir for a supply of liquid; a liquid pickup element including a porous wall formed of material having good capillarity to said liquid, said wall having at least a portion in contact with the liquid in said rservoir so that the liquid rises in said wall by capillary action; a chamber formed in said pickup element; and means connected with the chamber in said liquid pickup element for inducing a flow of gaseous fluid through the wetted wall into the chamber in said pickup element and for discharging the gas-liquid mixture which has passed into the chamber in said pickup element.

16. A system for supplying a stream of finely atomized liquid, comprising: means forming a reservoir for a supply of liquid; a liquid pickup element including a porous wall formed of material having good capillarity to said liquid, said wall having at least a portion in contact with the liquid in said reservoir so that the liquid rises in said wall by capillary action; a chamber formed in said pickup element; and means including a pump connected with the chamber in said liquid pickup element for inducing a flow of gaseous fluid through the wetted wall into the chamber in said pickup element and for discharging the gas-liquid mixture from the chamber in said pickup element in the form of a fine mist.

17. A system for supplying a stream of finely atomized liquid, comprising: means forming a reservoir for a supply of liquid; a hollow liquid pickup element including a porous wall formed of material having good capillarity to said liquid, said wall having at least a portion in contact with the liquid in said reservoir so that the liquid rises in said wall by capillary action; and means including a compressed fluid jet pump connected with the interior of said hollow liquid pickup element for inducing a flow of gaseous fluid through the wetted wall into the interior of said pickup element and for ejecting the gas-liquid mixture from the interior of said pickup element in the form of a fine mist.

18. A bearing lubrication system comprising: a shaft; bearing means for rotatably supporting the shaft; a casing for supporting the bearing means; means forming a reservoir in the casing for storing a supply of lubricant; a lubricant pickup element having a porous wall formed of material having good capillarity so that lubricant rises in said wall by capillary action, said pickup element having a portion of the porous wall disposed in the lubricant in said reservoir; a chamber formed in said pickup element; and means connected with the chamber in said pickup element for inducing a flow of air through the porous wall into the chamber and for transferring lubricant and air mixture from the chamber to said bearing means.

19. A bearing lubrication system comprising: a shaft; bearing means for rotatably supporting the shaft; a casing for supporting the bearing means; means forming a reservoir in the casing for storing a supply of lubricant; a lubricant pickup element having a porous wall formed of material having good capillarity so that lubricant rises in the wall by capillary action, said pickup element having a portion of the porous wall in contact with the lubricant in said reservoir; a chamber formed in said pickup element; and means for removing lubricant which permeates through said porous wall into said chamber and discharging said lubricant onto said bearing means.

20. A bearing lubrication system comprising: a shaft; bearing means for rotatably supporting the shaft; a lubricant supply means; a lubricant pickup element having a porous wall formed of material having good capillarity so that lubricant rises in the wall by capillary action, said pickup element having a portion of the porous wall in contact with the lubricant contained in said supply means; a chamber formed in said pickup element; and means for removing lubricant which permeates through said porous wall into said chamber and discharging said lubricant adjacent said bearing means.

21. A bearing lubrication system comprising: a shaft; bearing means for rotatably supporting the shaft; a casing for supporting the bearing means; means forming a reservoir in the casing for storing a supply of lubricant; a lubricant pickup element having a wall formed of sintered material having good capillarity so that the lubricant rises in said wall by capillary action, said pickup element having a portion of the wall in contact with the lubricant in said reservoir; a chamber formed in said pickup element; and means connected with the chamber in said pickup element for inducing a flow of air through the wall into the chamber and for transferring lubricant and air mixture from the chamber to the bearing means.

22. A system for supplying a stream of finely atomized liquid, comprising: means forming a reservoir for a supply of liquid; a liquid pickup element including a wall formed of sintered material having good capillarity so that the liquid rises in said wall by capillary action, said pickup element having a portion of the wall in contact with the liquid in said reservoir; a chamber formed in said pickup element; and means including a pump connected with the chamber in said liquid pickup element for inducing a flow of gaseous fluid through the wall into the chamber in said pickup element and for discharging gas-liquid mixture from the chamber in the form of a fine mist.

References Cited in the file of this patent

UNITED STATES PATENTS

| 1,298,972 | Latchow | Apr. 1, 1919 |
| 1,778,138 | Wood | Oct. 14, 1930 |
| 1,890,844 | Delaval-Crow | Dec. 13, 1932 |
| 1,902,887 | Oppenheim | Mar. 28, 1933 |
| 1,934,278 | Raule | Nov. 7, 1933 |
| 2,042,575 | Worth | June 2, 1936 |
| 2,261,236 | Dorer | Nov. 4, 1941 |
| 2,698,774 | Haller et al. | Jan. 4, 1955 |
| 2,702,093 | Sherrill | Feb. 15, 1955 |
| 2,709,567 | Wood | May 31, 1955 |
| 2,828,953 | Hartmann | Apr. 1, 1958 |
| 2,861,848 | Lovelock et al. | Nov. 25, 1958 |

FOREIGN PATENTS

| 766,531 | Great Britain | Jan. 23, 1957 |

UNITED STATES PATENT OFFICE
CERTIFICATE OF CORRECTION

Patent No. 3,017,230            January 16, 1962

John W. Meermans

It is hereby certified that error appears in the above numbered patent requiring correction and that the said Letters Patent should read as corrected below.

Column 2, line 31, after "section" insert -- taken --; line 37, strike out "in"; column 7, line 8, strike out "interior of".

Signed and sealed this 29th day of May 1962.

(SEAL)
Attest:

ERNEST W. SWIDER
Attesting Officer

DAVID L. LADD
Commissioner of Patents